(12) United States Patent
Willgert

(10) Patent No.: US 8,548,029 B2
(45) Date of Patent: Oct. 1, 2013

(54) MONITORING OF AN ANTENNA SYSTEM

(75) Inventor: Stefan Willgert, Spånga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1008 days.

(21) Appl. No.: 12/517,650

(22) PCT Filed: Dec. 11, 2006

(86) PCT No.: PCT/SE2006/050568
§ 371 (c)(1),
(2), (4) Date: Jun. 4, 2009

(87) PCT Pub. No.: WO2008/073010
PCT Pub. Date: Jun. 19, 2008

(65) Prior Publication Data
US 2010/0008455 A1 Jan. 14, 2010

(51) Int. Cl.
*H04B 1/00* (2006.01)
(52) U.S. Cl.
USPC ...... 375/148; 343/777; 375/144; 375/E1.032; 455/13.3
(58) Field of Classification Search
None
See application file for complete search history.

(56) References Cited

U.S. PATENT DOCUMENTS

| | | | |
|---|---|---|---|
| 5,131,006 A * | 7/1992 | Kamerman et al. | 375/130 |
| 5,937,005 A | 8/1999 | Obuchi et al. | |
| 6,266,528 B1 * | 7/2001 | Farzaneh | 455/423 |
| 6,463,295 B1 * | 10/2002 | Yun | 455/522 |
| 6,792,031 B1 | 9/2004 | Sriram et al. | |
| 2003/0210750 A1 * | 11/2003 | Onggosanusi et al. | 375/295 |
| 2005/0245222 A1 | 11/2005 | Lehnert et al. | |
| 2006/0211379 A1 * | 9/2006 | Mantha et al. | 455/73 |

FOREIGN PATENT DOCUMENTS

| | | |
|---|---|---|
| JP | 2004260435 A | 9/2004 |
| WO | 0040050 A1 | 7/2000 |

OTHER PUBLICATIONS

Harteneck, M. et al. "Practical Implementation Aspects of MMSE Equalisation in a 3GPP HSDPA Terminal." 2004 IEEE 59th Vehicular Technology Conference (VTC 2004—Spring). vol. 1, May 17-19, 2004, pp. 445-449.

* cited by examiner

*Primary Examiner* — Adolf Dsouza
(74) *Attorney, Agent, or Firm* — Coats & Bennett, P.L.L.C.

(57) ABSTRACT

The present invention relates to a method and apparatus for monitoring an antenna system comprising at least two antenna branches providing antenna diversity. At least a first signal branch measure and a second signal branch measure are repeatedly generated in response to a first signal branch and a second signal branch received by a respective one of the at least two antenna branches, thus generating a first plurality of second signal branch measure values in a manner so that the first and second pluralities reflect the quality of the first and second signal branches, respectively, at different points in time. The first and second pluralities are analysed in order to distinguish any differences in the performance of the first and second antenna branches.

20 Claims, 6 Drawing Sheets

100

MONITORING OF AN ANTENNA SYSTEM

FIELD OF THE INVENTION

The present invention relates to the field of radio communication, and in particular to the monitoring of antenna systems providing antenna diversity.

BACKGROUND

An antenna system is a most vital part in a mobile radio communications system. Errors in the antenna system give rise to a reduced coverage area and a decrease in the information throughput. Hence, it is important to monitor the state of the antenna system.

One method of monitoring the state of an antenna system is to perform Voltage Standing Wave Ratio (VSWR) measurements, where a transmitted signal and the reflected part of the transmitted signal are determined and compared in order to determine the state of the antenna system. However, this method can only be used for the monitoring of antenna systems in radio base stations which comprise both a transmitter and a receiver.

Another method of monitoring antenna systems is to measure the DC feeder resistance. However, since the feeder resistance varies as equipment, such as filters, amplifiers etc., are introduced to or removed from, the antenna system, this method requires knowledge of which equipment is presently connected to the antenna system.

The above mentioned methods do not explicitly show whether the receiver is affected, but rather that the impedance of the antenna system has changed. A further problem with the above mentioned methods is that manual configuration of the measurement equipment is generally required, since there exist many different types of antenna configurations and transceiver/receiver units.

SUMMARY

A problem to which the present invention relates is how to improve the performance of an antenna system.

This problem is addressed by a method of evaluating an antenna system which are connected to a radio device, where the antenna system comprises at least two antenna branches. The method comprises receiving a radio signal as a first signal branch in a first antenna branch: receiving the radio signal as a second signal branch in a second antenna branch. The method further comprises repeatedly generating a first signal branch measure of the first signal branch and a second signal branch measure of the second signal branch, thus generating a first plurality of first signal branch measure values and a second plurality of second signal branch measure values in a manner so that the first and second pluralities reflect the quality of the first and second signal branches, respectively, at different points in lime; and analysing the first and second pluralities in order to distinguish any differences in the operation of the first and second antenna branches.

The problem is further addresses by a radio device adapted to be connected to at least a first and a second antenna branch on which a first and a second signal branch, respectively, may be received. The radio device is arranged to repeatedly generate a first signal branch measure of the first signal branch and a second signal branch measure of the second signal branch: thus generating a first plurality of first signal branch measure values and a second plurality of second signal branch measure values in a manner so that the first and second pluralities reflect the quality of the first and second signal branches, respectively, at different points in time. The radio device further comprises a signal branch comparator having an input arranged to receive signals indicative of the first and second signal branch measures, and being adapted to analyse the first and second pluralities in order to distinguish any differences in the operation of the first and second antenna branches.

By the inventive method and radio device is achieved that any differences in performance of the antenna branches may be detected. Such differences give an indication that an antenna branch may experience a fault. By ensuring that faults in the antenna system can be detected and attended to, the performance of the radio device will improve, and the overall performance of a radio system of which the radio device forms a part will be improved.

The invention can advantageously be applied to a radio device operating according to code division multiple access, where at least one scrambling code and/or channelisation code are applied to the first and second signal branches in order to de-scramble and/or de-spread the first and second signal branches, respectively. In this context, the first and second signal branch measures can advantageously be generated in response to the de-scrambled and/or de-spread first signal branch and the de-scrambled and/or de-spread second signal branch, respectively. The de-scrambled/de-spread signal branches show a higher signal-to-interference-and-noise-ratio than the signal branches before de-scrambling/de-spreading, and a difference in the quality of the signal branches can therefore more easily be discerned after de-scrambling/de-spreading than before.

In case of the radio device comprising a rake receiver, the first and second branch measures can advantageously be obtained in response to an output from the rake receiver. In one embodiment of this aspect of the invention, samples are obtained of the first and second signal branches, thus forming a first and second stream of samples obtained from the first signal branch and the second signal branch, respectively. The rake receiver has a set of rake fingers operative to select a set of samples from the first and second streams of samples: and the first signal branch measure is obtained in response to the number of samples selected by the rake receiver from the first stream of samples during a time period; and the second signal branch is obtained in response to the number of samples selected by the rake receiver from the second stream of samples during the time period.

The first and second signal branch measures may alternatively be obtained as signal-to-noise-and-interference-ratio values obtained on the first and second signal branches, respectively. When the radio device comprises a rake receiver, the signal-to-noise-and-interference-ratio values of an antenna branch may advantageously be obtained from signals processed by the rake receiver.

The signal branch measure of a signal branch may be obtained from signals received on any logical channel, such as a random access channel or a traffic channel. The random access channels are often processed on the same circuit board for all antenna branches, and the process of identifying any erroneous antenna branch could easily be centralised if the signal branch measures are performed on the random access channel signals, thus rendering the construction of the signal branch comparator simple.

The comparison of the signal branch measures can be performed on a per-measurement basis, or performed on an average signal branch measure calculated as the average value of a plurality of signal branch values obtained on a signal branch. By performing a per-measurement comparison, the differences in signal-to-noise-and-interference ratio values between signals originating from different radio transmitters experiencing different radio conditions can be compensated for.

The problem is further addressed by a computer program product comprising computer program code operable to execute the inventive method when run on computer means.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
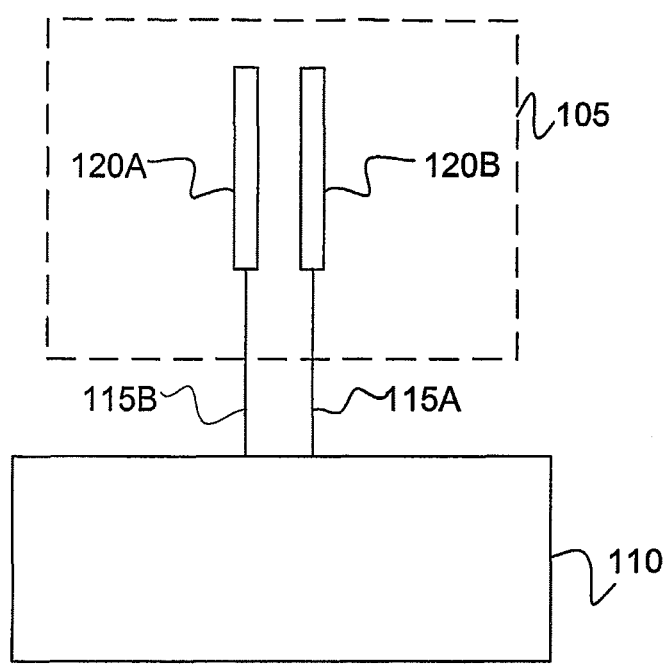
FIG. 1 is a schematic drawing of a radio base station employing antenna diversity.

FIG. 1 is a schematic illustration of a radio base station 100 comprising an antenna system 105, and a signal processing part 110. In the signal processing part 110, radio and base band processing of a signal received by the antenna system 105 is performed. The processing could for example include demodulation of the signal so that a digital version of the signal is obtained, de-coding, de-interleaving, de-multiplexing and rake receiving. In a mobile radio system operating according to spread spectrum multiple access/code division multiple access (CDMA), the processing performed in the signal processing part 110 of the radio base station 100 includes de-scrambling of the signal by applying the appropriate scrambling codes to the digital signal in order to retrieve the signals transmitted by different transmitters (typically, different mobile stations). The signal processing part 110 of a radio base station operating according to a spread spectrum multiple access/code division multiple access standard typically further applies a channelisation code to the retrieved transmitted signal in order to de-spread the signal.

The antenna system 105 is connected to the signal processing part 110 via a feeder 115. The radio base station 100 would typically be connected, via a transport part (not shown), to a base station controller (BSC) or a radio network controller (RNC) of a mobile radio communications system, where the radio base station 100 would provide radio links for communication with mobile stations roaming in the mobile radio communications system.

Antenna system 105 can comprise antenna(s) for signal reception, and/or antenna(s) for signal transmission. Furthermore, in most mobile radio communications systems, antenna diversity is employed. An antenna employing antenna diversity comprises two (or more) antenna elements so that a signal can be received and/or transmitted by two (or more) different antenna elements at the same time. Such different antenna elements could e.g. comprise different physical antennas placed at different points in space—so called space diversity—or different antenna elements for receiving signal elements of different polarity—so called polarisation diversity. By introducing antenna diversity, the negative effects of fading are reduced, since the fading conditions are not the same at different points in space (space diversity) or for different polarisations of the signal (polarisation diversity). By receiving the signal at two or more different antenna elements for which the fading conditions are basically uncorrelated, the probability of receiving a version of the signal having sufficient signal strength is greatly increased. The different antenna elements providing antenna diversity to an antenna is often referred to as different antenna branches. In FIG. 1, the antenna system 105 comprises two antenna branches 120A and 120B, respectively connected to the signal processing part 110 via feeders 115A and 115B. The antenna branches 120 could be realized by space diversity, as in FIG. 1, by polarisation diversity, a combination of the two, or any other type of antenna diversity.

An antenna system 105 employing antenna diversity on the receiving signals thus receives different versions of a received signal on the different antenna branches 120. According to the invention, the different versions of the received signals can be compared in order to detect any errors that have occurred on one of the antenna branches. In the following, the different versions of a signal that have been received on different antenna branches 120 will be referred to as different signal branches.

By acquiring comparison results from the different received signal branches at several points in time, an indication can be obtained as to whether or not the different antenna branches 120 operate in the same way. If one antenna branch 120 generally gives rise to a weaker signal branch than the other(s), this is a good indication that the operation of this antenna branch 120 may be faulty. Advantageously, the signal branches of many received signals are analysed in order to obtain good statistical certainty of the result.

According to the invention, a signal branch measure, indicating the quality of the signal received on a signal branch, is obtained at several points in time for the different antenna branches 120 that are to be compared. When comparing the signal branch measures for more than two different branches, the comparison could preferably be performed on a two-and-two basis.

Figure 2:
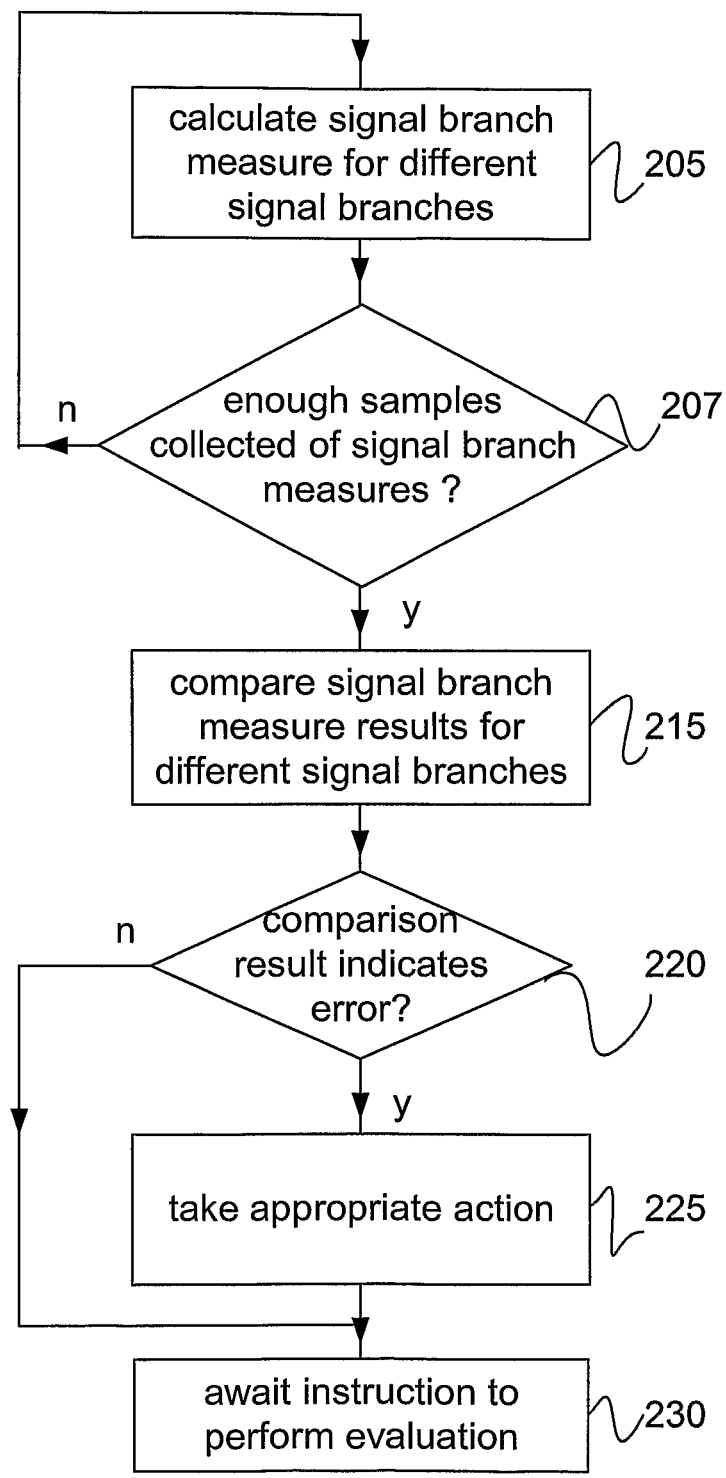
FIG. 2 is a flowchart illustrating an embodiment of the invention.

An embodiment of the inventive antenna system evaluation process is schematically illustrated in FIG. 2. The antenna system evaluation process of FIG. 2 could be performed continuously, at regular intervals, or on demand.

A signal is received at different antenna branches 120. In step 205, a value of a signal branch measure, indicative of the signal quality of the signal branch received by an antenna branch 120, is collected for the antenna branches 120 that are to be compared. In step 207, it is checked whether enough values of the signal branch measures have been collected. This check could for example involve checking whether a timer, set before the first signal branch measure measurement was taken, has reached a pre-determined time, or whether a counter, which is incremented each time a signal branch measure measurement is taken, has reached a pre-determined number. Such pre-determined time period could typically be in the order of minutes (e.g. 2 minutes), and a typical pre-determined number of samples could for example be in the order of 1000. If enough samples have not been collected, then step 205 is re-entered and another signal branch measure is collected from each of the antenna branches 120 that are part of the comparison. In step 215, the values of the signal branch measures are compared for different signal branches, for example by calculating the ratio or the difference between the average values of the signal branch measures of the antenna branches 120, in order to determine whether the quality of the different branches differ significantly. Different signal branch measures, as well as different methods of comparing the signal branch measures, are further discussed below.

In the embodiment of the invention illustrated by FIG. 2, the step of collecting of signal branch measure values of steps 205 and 207 is completed before any evaluation and comparison of the signal branch measure results take place in step 215. Needless to say, the comparison of the collected signal branch measure values could start while new signal branch measure values are still being collected.

When more than two antenna branches 120 are present, several comparisons of the signal branch measure values could advantageously be made on a two-and-two basis.

If it is found in step 215 that the signal quality of any of the antenna branches 120 differ significantly from the other branches, step 220 is entered wherein appropriate action is taken, such as e.g. the issuing of an alarm or the start-up of further investigation processes. Step 230 is then entered, in which an instruction to start the antenna system evaluation process is awaited. If the comparison in step 220 does not indicate any erroneous performance of any of the antenna branches 120, step 230 is entered without first entering step 225.

Rather than measuring the signal branch measure of the first and second antenna branches, the signal branch measure of the combined signal from two antenna branches 120 could be measured/estimated in step 205 of FIG. 2, as well as the signal branch measure of one of the signal branches 305. The signal branch measure value of the second signal branch 305 for which a signal branch measure value is desired can then easily be derived as the difference between the signal branch measure value of the combined signal and the signal branch measure value of the first signal branch.

Branch information of the received signal is normally known within the radio part of the signal processing part 110, wherein demodulation of the received signal takes place, and the base band part, wherein further processing of the demodulated signal takes place. The comparison can thus be made in the radio part of the signal processing part 110 as well as in the base band part of the signal processing part 110. In a mobile radio communication system operating according to the Wideband Code Division Multiple Access (WCDMA) standard, the base band part of the signal processing part 110 is generally implemented in the "Node B uplink user data processing for Uu-interface (User equipment-network layer part 1)".

When the comparison is made in the radio part of signal processing part 110, a useful signal branch measure to be used in the comparison could for example be the received signal strength as measured in the radio part (which can for example be measured as "RXLEV" in a system based on the GSM standard, and as "RSCP" in a system based on the WCDMA standard. The received signal strength is particularly useful as a signal branch measure in the comparison between different signal branches in situations where the signal-to-noise-and-interference ratio is comparatively high, so that the received signal strength effects of interference or noise on the received signal strength is low. This is typically the case in a mobile radio communication system based on the GSM standard.

In a system based on spread spectrum multiple access/code division multiple access (CDMA), such as a mobile radio communications system based on the WCDMA standard, the signal-to-noise-and-interference levels are typically comparatively low, and it is often difficult to discern any difference in the signal-to-noise level of the different antenna branches 120. However, the present invention acknowledges that after the received signal has been de-scrambled by applying the appropriate scrambling code and/or has been de-spread by use of appropriate channelisation codes, the signal-to-noise-and-interference-ratio is increased. By performing the comparison between antenna branches 120 based on signal branch measures obtained after de-scrambling and/or de-spreading of the received signal has been performed, the reliability of the method will be improved.

When an antenna branch 120 receives a signal branch 305 carrying information relating to several radio links, measurements could be made on all of these links. The signal branch measure values could advantageously be collected at the traffic channel of active radio links, for example as specified in 3GPP TS 25.215, *Physical layer measurements: (FDD)*. Measurements could for example advantageously be performed on the pilot bits of the Dedicated Physical Control Channel (DPCCH). The pilot bits include a well defined pattern of several bits, thus simplifying the measurement procedure. Alternatively, the signal branch measure may be collected on the random access channel (RACH). In particular, the signal branch measure may advantageously be collected on the pre-amble part of the random access channel.

Base Station Including a Rake Receiver

In one aspect of the invention in which the signal processing part 110 of the radio base station 100 comprises a rake receiver, the signal branch measures can be obtained from an output signal from the rake receiver.

A rake receiver of a radio base station 100 typically operates in the base band to compensate for the fact that a received signal has been transmitted over a multi-path channel and has therefore been smeared due to a difference in path length of the different paths. In the rake receiver, signal components that represent the same data but have experienced different path lengths (and are therefore received by the antenna system 105 at different points in time) are synchronised.

A rake receiver of L rake fingers operates to periodically select the L strongest samples of a number of samples having been sampled from the received signal within a certain time period $T_{rake}$, and then processes these samples individually prior to adding them into an output signal (often by first multiplying them with a weight factor).

Figure 3:
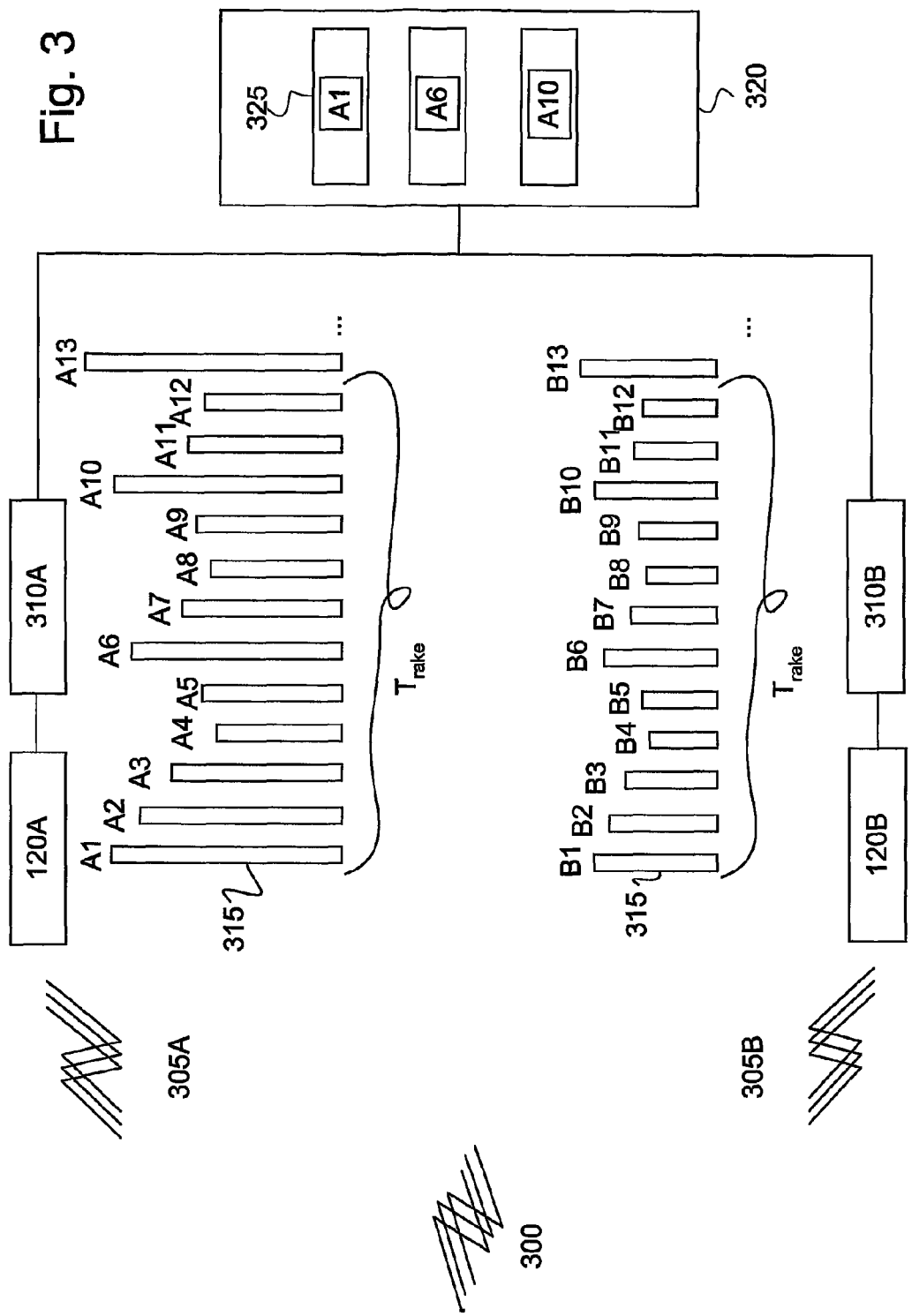
FIG. 3 is a schematic drawing of a radio base station comprising a rake receiver.

The concept of a rake receiver is schematically illustrated in FIG. 3. A signal 300 is illustrated to comprise three different signal components which have traveled along three different signal paths. The signal is received by a radio base station 100 comprising two antenna branches 120A and 120B, so that a signal branch 305A of signal 300 is received by the antenna branch 120A, and a signal branch 305B is received by the antenna branch 120A. For illustration purposes, the antenna branches 120 of FIG. 3 are illustrated to be space diversity antenna branches, however, any antenna diversity method could be employed.

The radio base station 100 of FIG. 3 further comprises two samplers 310A and 310B, connected to the antenna branches 120A and 120B, respectively. (The two samplers 310A and 310B could be implemented in the same physical processor, or in different physical processors. Furthermore, a sampler 310 could be implemented in one or more physical processors).

The signal branches 305A and 305 B are fed from the antenna branches 120A and 120B to the samplers 310A and 310B, where, inter alia, the samplers 310 operate to sample the signal branches 305 at regular intervals. The sampling is illustrated in FIG. 3 as a number of signal samples 315, the exemplary signal samples 315 which have been sampled by sampler 310A in FIG. 1 being indicated as samples A1-A13, and the signal samples 315 which have been sampled by sampler 310B being indicated as samples B1-B13. The height of a signal sample 315 corresponds to the signal strength of the received signal branch 305.

A rake receiver 320 including L different rake fingers 325 is connected to the samplers 310A and 310B of FIG. 3, where L=3 in the example of FIG. 3. The rake receiver 320 operates to select the L strongest samples during a time interval $T_{rake}$, and process these L samples in the L rake fingers 325. In the example given by FIG. 3, the L (=3) strongest samples sampled during the time interval $T_{rake}$, (which in the illustration corresponds to 12 samples), are all derived from the signal branch 305A received by antenna branch 120A, and these 3 strongest samples, i.e. samples A1, A6 and A10, are processed in the 3 rake fingers 325 of the example.

A reason for a first antenna branch 120 to receive a weaker signal branch 305 than the other signal branch(es) of a radio base station 100 could be that the signal branch 305 received by the first antenna branch 120 has experienced more fading than the other signal branches. However, another reason could be that there is something wrong with the first antenna branch 120.

Number of Samples Selected by Rake Fingers Used as Signal Branch Measure

In one embodiment of the invention, the number of samples selected by the rake receiver from a signal branch 305, or a measure derived from this number, is used as the signal branch measure of the signal branch 305. In other words, the number of samples selected by the rake fingers 320 from a particular antenna branch 120 is compared to the number of samples selected from the other antenna branch(es) 120 over a period of time. If the rake receiver is arranged to select the L strongest samples, regardless of which antenna branch 120 the samples originate from, a comparison between the different antenna branches 120 of an antenna system 105 could be based on the number of rake fingers 325 that select a sample from each of the signal branches within a time interval $T_{rake}$. By performing this comparison, an indication is given as to whether the antenna branches 120 operate equally well, or whether there is an erroneous behaviour of one or more antenna branches 120. If the rake receiver 320 only has one rake finger 325, the percentage of samples selected by the rake finger 325 from one signal branch 305 could be used as a signal branch measure.

SIR as a Signal Branch Measure

In a mobile communications system operating according to a CDMA standard, the signal branch measure can advantageously be calculated as a measure of the signal-to-noise-and-interference-ratio (SIR) on the signal after de-scrambling of the signal and/or after de-spreading of the signal has been performed. As discussed above, SIR of the signal is higher after de-scrambling and de-spreading, and the probability of discerning any difference in SIR between the different antenna branches 120 increases as compared to performing the SIR calculation on the signal prior to de-scrambling and/or de-spreading. Thus, less measurement values are required than if the SIR-comparison were to be made in the radio part of the signal processing part 110. This means, inter alia, that statistically accurate results can be obtained also when the traffic is low. i.e. when there are few active mobile stations transmitting to the radio base station 100.

Many implementations of a radio base station 100 employ a mechanism for determining a target value for the SIR value of a radio link. In such implementations, the target SIR value for different radio links need not be the same, and the target SIR value for a radio link may vary with time. Hence, to simply use the SIR measurement values as the signal branch measure may not give a correct result, since the target SIR value may not have been the same at the different measurement occasions or different radio links. In order to account for this, one could for example ensure that only SIR measurement values that have the same SIR target value are included in the comparison. Alternatively, a relation between the SIR measurement value and the corresponding SIR target value, referred to as $SIR^{error}$, could be used as the signal branch measure. $SIR^{error}$ could be expressed as:

$$SIR^{error} = SIR^{measured} - SIR^{target} \quad (1).$$

where $SIR^{target}$ and $SIR^{measured}$ have been measured/averaged over the same period of time. $SIR^{error}$ could alternatively be expressed as a ratio between $SIR^{measured}$ and $SIR^{target}$. In the following, when the use of SIR as a signal branch measure is discussed, this should be construed to include the use of $SIR^{error}$. as well as a measure of SIR, as a signal branch measure.

SIR can advantageously be used as a signal branch measure in a radio base station 100 comprising a rake receiver 320, and the signal branch measure of a signal branch 305 can be calculated as the base band signal-to-interference-and-noise-ratio of the branch at the rake receiver, $SIR_{rake}$. In a radio base station 100 operating according the WCDMA standard, the signal received by the rake receiver 320 has normally been de-scrambled and de-spreaded by the Application of appropriate channelisation codes prior to arriving at the rake receiver 320. $SIR_{rake}$ can be expressed as:

$$SIR_{rake} = \sum_{k=1}^{m} \frac{S_k}{n_k}, \quad (2)$$

where $S_k$ and $n_k$ are the signal strength and the estimated noise-and-interference level, respectively, of the part of the signal branch processed by the $k^{th}$ rake finger 325 during a time interval T, and m is the number of rake fingers 325 that have selected samples 315 from signal branch 305 during the time interval T (m≥1). Alternatively, a SIR measurement can be obtained at the output of the rake receiver 320, where the outputs of the different rake fingers 325 has been combined into one signal.

In a radio base station 100 operating according to the WCDMA standard, a measurement of SIR can advantageously be obtained on the Dedicated Physical Control Channel (DPCCH) by calculating the ratio between the Received Signal Code Power (RSCP) and the Interference Signal Code Power (ISCP), and multiplying the ratio with the Spreading Factor (SP). The RSCP is the unbiased measurement of the received power on one code, and the ISCP is the interference on the received signal (see e.g. the technical specification 3GPP TS 25.215).

There may be reasons to why a SIR-value is occasionally not obtained for an antenna branch 120. Thus, in order to increase the comparability of the SIR-values of the different antenna branches 120, one could ensure that for a SIR-measurement of a first signal branch 305 included in the comparison of step 215 of FIG. 2, there exists a corresponding SIR-measurement of the signal branch 305B to which the first signal branch 305 is to be compared. Furthermore, any SIR-measurements which have been collected when the transmitting mobile station was not synchronised with the radio base station 100 can advantageously be excluded from the comparison of step 215.

As mentioned above, the signal branch measure values could be collected at the traffic channels, or on the random access channels (RACH). The signal processing part 110 of the radio base station 100 typically measures the power of the signal branches 305 of the preambles of the RACH at regular intervals (e.g. even half chip), and/or the power of the combination of the different signal branches 305. Interference & noise estimates of the pre-ambles can also be obtained. An appropriate signal branch measure could then be the $SIR_{rake}$ of the signal branch 305 as given in equation (2). An advantage of performing the signal branch measure measurements on the random access channels is that the random access channels are often processed on the same circuit board for all antenna branches 120, and the process of identifying any erroneous antenna branch 120 could easily be centralised. To improve the error identification process, one could preferably choose to base the signal branch measure measurements only on the random access preambles that result in an acknowledgment (typically in Layer 1), since the acknowledgement indicates that the signal quality lies above a certain threshold.

Comparison Between Different Antenna Branches

According to the invention, a number of signal branch measure values are collected for at least two antenna branches 120, and the signal branch measure values of the different antenna branches 120 are compared in order to detect any erroneous behaviour of any of the antenna branches 120. The comparison between the signal branch measure values of the different antenna branches can be made in different ways.

When a measurement of SIR is used as a signal branch measure, either as measured on traffic channels or on the random access channel, a simple test of the appropriate function of the different antenna branches 120 could be a check as to whether a SIR-value has been obtained for all antenna branches 120—if a branch 120 does not generate any SIR-values over a longer period of time, this may be an indication of malfunction of this antenna branch 120.

The comparison between the signal branch measures performed in step 215 of FIG. 2 could for example be performed by comparing the average signal branch measures of different signal branches (where the average values may for example be obtained by measuring the signal branch measures over a pre-determined period of time, or by including a predetermined number of signal branch measure values in the average signal branch measure calculation). Over a period of time, the ratio between the average signal branch measures from two different antenna branches 120 should approach 1, whereas the difference should approach 0, when both antenna branches 120 operate equally well. If the comparison performed in step 215 involves calculating the difference between the average value of the signal branch measure of two antenna branches 120, a predetermined threshold value could be used in the check for erroneous behaviour performed in step 220 of FIG. 2, so that when the magnitude of this difference exceeds the threshold value, step 225 should be entered and action should be taken. Depending on the signal branch measure used, different threshold values could be applied. When the comparison in step 215 involves calculating a ratio between signal branch measures of two different signal branches, the check of step 220 could include a check as to whether the ratio R lies within an interval $[R_{min}, R_{max}]$, where $R_{min}<1<R_{max}$, and where the values of $R_{min}$ and $R_{max}$ are chosen in accordance with which signal branch measure is used.

Figure 4:
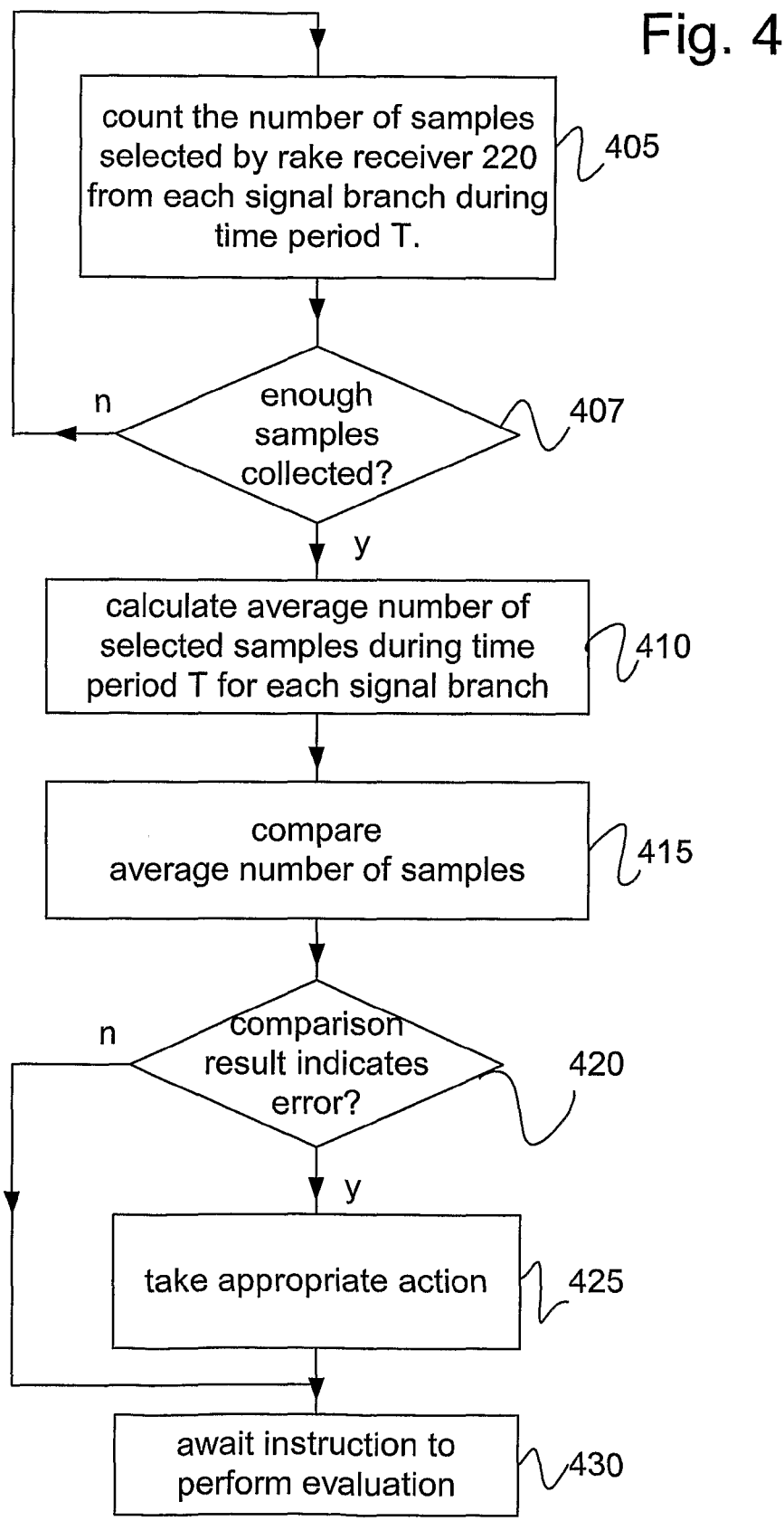
FIG. 4 is a flowchart illustrating an embodiment of the invention.

FIG. 4 is a flowchart illustrating an embodiment of the inventive method wherein the comparison of step 215 is performed as a comparison between average values of the signal branch measures of two different antenna branches 120, and the number of samples 315 selected by the rake receiver 320 of a radio base station 100 from a signal branch 305 during a time period T is used as a signal branch measure of the signal branch 305.

In the example of FIG. 4, a radio signal 300 is received in different antenna branches 120 of the radio base station 100 as different signal branches 305. In step 405, the number samples 315 from a signal branch 305 that are selected by a rake finger 325 is counted for the different signal branches 120 during a time period T, which could for example be the time interval $T_{rake}$. In step 407 it is checked whether the number of time periods during which the selected number of samples have been counted are sufficient. If not, step 405 is re-entered, and if so, step 410 is entered. In step 410, the average number of samples selected from a signal branch 305 is calculated for the different signal branches 305. In step 415, the average number of samples of the different signal branches 305 are compared with each other. In step 420, it is checked whether the comparison result indicates any erroneous behaviour of any of the antenna branches 120.

The comparison between the number of samples selected from the two different antenna branches 120 performed in step 415 could e.g. be made as a ratio of the number of samples selected from the two antenna branches 120, or as a difference. If the comparison is performed as a ratio, the step of calculating an average number of selected samples could advantageously be omitted, and instead, the time period T in step 405 can be set to an appropriate length, typically in the order of minutes (e.g. 2 minutes). Typical values of the end values $R_{min}$ and $R_{max}$ of the interval within which the ratio R should lie could then e.g. be [0.5:2].

The average value of a signal branch measure (SBM). $\overline{SBM}$, can advantageously be calculated by adding signal branch measure values from several or all radio links received by an antenna branch 120, and by adding the signal branch measure values obtained during a time period:

$$\overline{SBM} = \frac{1}{M}\sum_{l=1}^{M} SBM^{l}. \tag{3}$$

where M is the total number of measurement values of the signal branch measure collected on a signal branch 305 during the time period. As mentioned above, the total number of measurement values, M, can include measurement values from different radio links. If the total number of measurement values is the same for each antenna branch 120 to be included in the comparison, an aggregate signal branch measure could be calculated instead of an average signal branch measure value of eq. (3), i.e. the division by M could be omitted from eq. (3).

When a signal-to-noise-and-interference measure is used as a signal branch measure, the comparison made in step 215 of FIG. 2 could advantageously be performed as a calculation of the difference between the logarithm of the average value of SIR, $\overline{SIR}$ of a first antenna branch 120A and the logarithm of $\overline{SIR}$ of a second antenna branch 120B. An exemplary expression for obtaining a comparison result between the two branches 120A and 120B is provided by equation (4):

$$\overline{SIR^{A-B}}=10 \log_{10} \overline{SIR^{A}}-10 \log_{10} \overline{SIR^{B}} \tag{4}$$

The magnitude of $\overline{SIR^{A-B}}$ of equation (4) is a measure of how similar the signal branches 305, received by the two antenna branches 120A and 120B, are. If the magnitude of $\overline{SIR^{A-B}}$ is below a certain threshold, then both antenna branches 120A and 120B would be considered to operate normally. If not, depending on the sign of $\overline{SIR^{A-B}}$, an error would be suspected in either signal branch 120A or in signal branch 120B.

In alternative embodiment of the comparison step 215 of FIG. 2, the comparison between different signal branches could be performed on a per measurement basis rather than on an average signal branch measurement basis. The result of such per-measurement-comparison will in the following be referred to as the per-measurement-comparison-result. The per-measurement-comparison-result could be obtained by calculating the ratio or difference between two signal branch measure values, obtained at the same time, on two different antenna branches 120 (needless to say, a measurement value of a branch measure does not necessarily reflect an instantaneous value of the branch measure, but could be an average value of the branch measure over a period of time). By analysing a set of such per-measurement-comparison results, an indication of whether the operation of any of the antenna branches 120 is erroneous can be obtained. The analysis could e.g. include calculation of the average value of the per-measurement-comparison results:

$$\overline{SBM^{diff}} = \frac{1}{M}\sum_{l=1}^{M}(SBM_A^l - SBM_B^l), \quad (5)$$

where M is the number of per-measurement-comparison results. If the magnitude of $\overline{SBM^{diff}}$ exceeds a threshold value, this indicates possible malfunction of one of the antenna branches 120A or 120B. The sign of $\overline{SBM^{diff}}$ indicates which of the antenna branches 120 experiences the problems. When using SIR as a signal branch measure (SBM), an advantage of calculating $\overline{SBM^{diff}}$ instead of calculating the difference between the average values of the signal branch measures according to eq. (3) is that any differences in target values of the signal branch measures included in the averaging will be compensated for. The average value of the per-measurement-comparison results can alternatively be expressed as $$\overline{SBM_{A-B}} = 10\log\frac{1}{M}\sum_{l=1}^{M}(|SBM_A^l - SBM_B^l|). \quad (6)$$

This expression can be particularly useful when using SIR as a signal branch measure, since appropriate resolution can be obtained. However, expression (6) does not give any indication of which of the two antenna branches 120 experiences problems. Further analysis of the set of per-measurement-comparison results would be required in order to obtain such information.

The distribution of the per-measurement-comparison results often provide further information regarding any possible erroneous behaviour of any of the antenna branches 120. By analysing the distribution of such per-measurement-comparison-results, for example by plotting the number-of-measurement-results vs. the per-measurement-comparison-results in a distribution graph, information regarding the status of the antenna branches 120 can be obtained. If the antenna branches 120 operate ideally, the distribution of the difference between the measurement results should be centred around zero (the ratio should be centred around 1). The standard deviation of the distribution can give additional information. For example, if the feeder of a first antenna branch 120 is connected to signalling part 110 serving a first cell, and the feeder of a second antenna branch 120 is connected to a signalling part 110 serving a second cell, the standard deviation of the distribution will be large. Problems with the antenna equipment or losses in the radio frequency path would give a ratio of the standard deviation and the absolute value of the difference that is smaller than would be obtained if there is an antenna diagram mismatch, etc.

Figure 5:
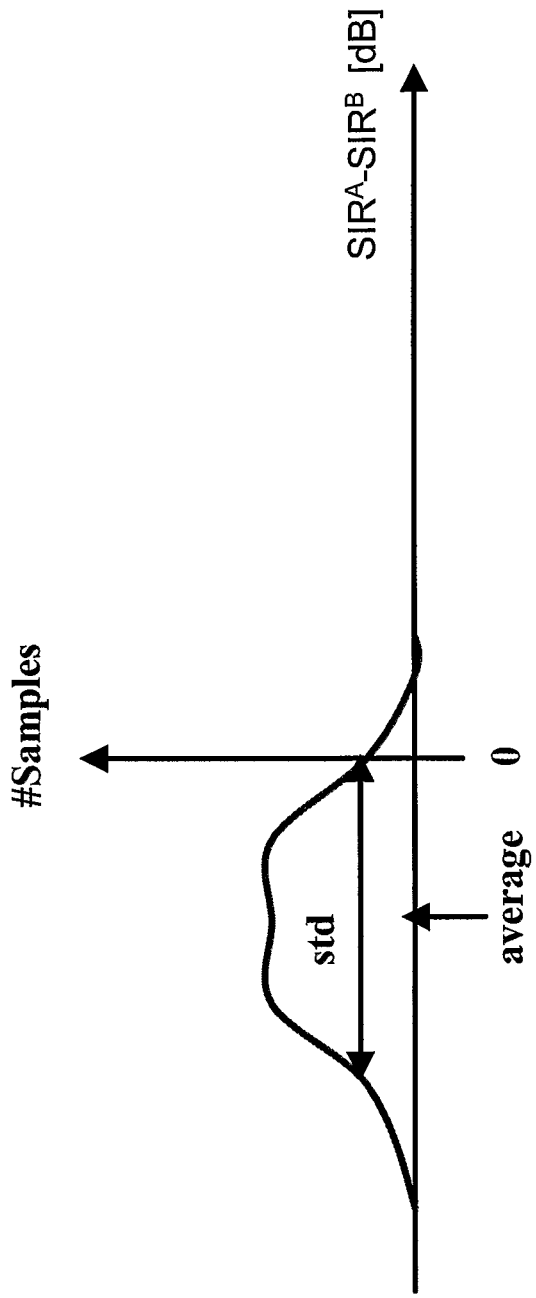
FIG. 5 is a distribution graph illustration a method of analysing data.

An illustration of a per-measurement distribution graph is provided in FIG. 5, in an embodiment in which $SIR_{rake}$ is used as the signal branch measure. The difference in $SIR_{rake}$ has been calculated for two different antenna branches A and B for a number of measurements, and the distribution of $SIR_{rake}^A - SIR_{rake}^B$ for these measurements is plotted in the graph of FIG. 5. The distribution illustrated in FIG. 5 indicates that the antenna branch A is functioning less well than antenna branch B, since the average value is less than zero. Alternatively, the comparison could be a visual comparison, where the per-measurement-values are plotted in the same graph for the antenna branches 120 to be compared, rather than the difference or ratio between the signal measures of the different antenna branches 120.

Table 1 illustrates examples of threshold values of the distribution that could be used in notifying an operator of the antenna system 105 of a possible error. Threshold values are given for the magnitude of the average value of the distribution, the standard deviation of the distribution as well as the ratio of the standard deviation and the absolute value of the average. Table 1 relates to the situation where the $SIR_{rake}$ is used as the signal branch measure, and the comparison between two different antenna branches is performed as a difference (cf. FIG. 5). The actual thresholds given in Table 1 are not to be seen as absolute numbers, but as a guidance for which thresholds could be used in an implementation of the invention.

TABLE 1

Threshold values for indication of errors in the antenna system 105.

| Error | Std | \|average\| | std / \|average\| |
|---|---|---|---|
| Swapped feeder | std > 20 dB | | |
| Losses in RF path | | >3 dB | <3 dB |
| Antenna diagram mismatch | | ≤3 dB | >3 dB |
| None of the above | ≤20 dB | ≤3 dB | |

The above described evaluation of an antenna system 105 could advantageously be implemented so that the evaluation result, either in the form of all or some of the collected signal branch measure values, and/or in the form of error indication(s), are transmitted over a control channel to an operations & maintenance centre. A mobile radio communications system comprises a large number of radio base stations which are distributed over a vast geographical area, and the possibility of efficient remote monitoring of the antenna systems 105 of the system will greatly improve the efficiency of the operations & maintenance of the mobile radio system.

Figure 6:
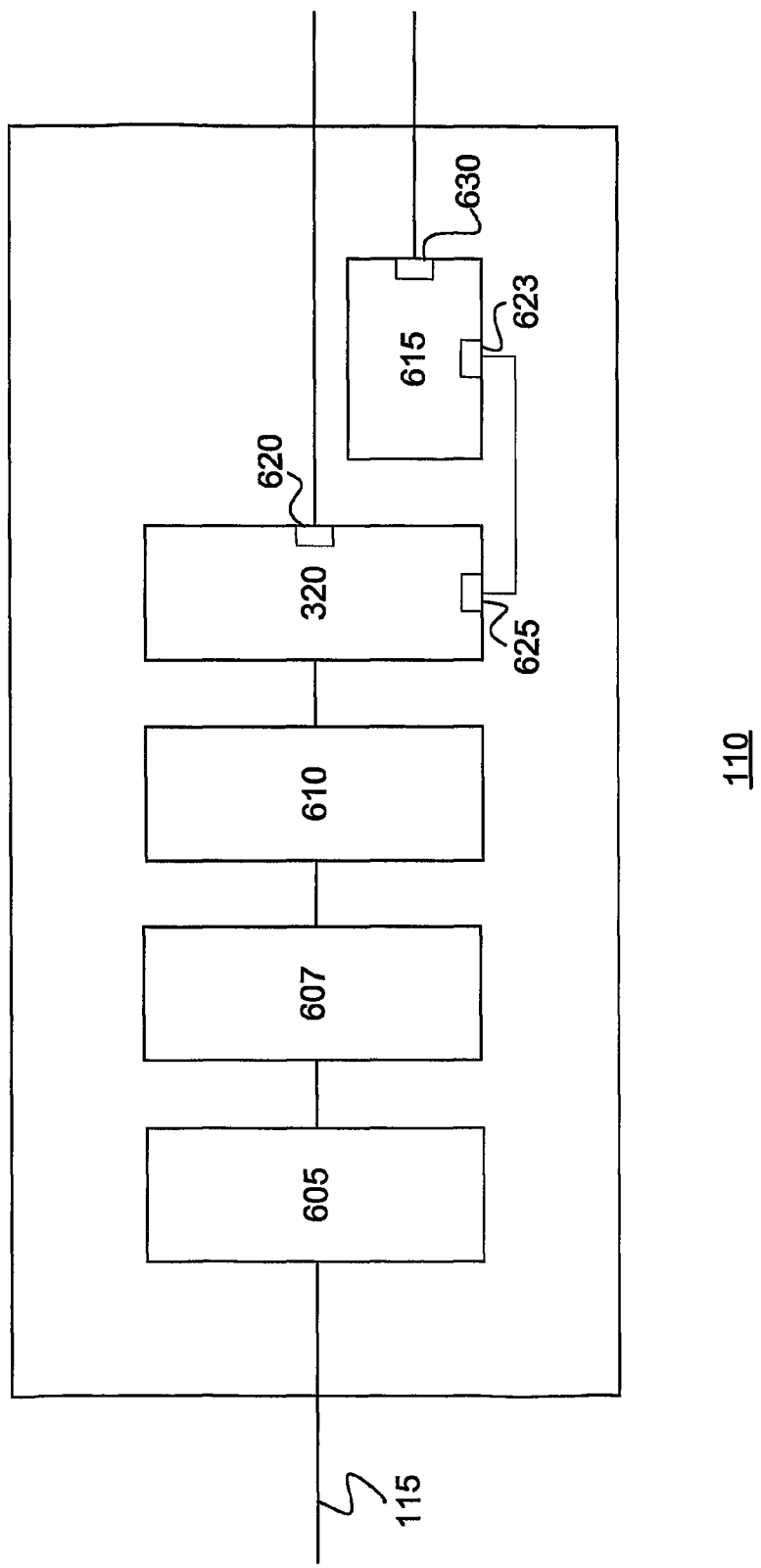
FIG. 6 is a schematic drawing of a radio base station in which an embodiment of the invention is incorporated.

FIG. 6 is a schematic illustration of an exemplary signal processing part 110 of a radio base station 100, operating according to spread spectrum multiple access/code division multiple access, in which an embodiment of the invention has been implemented. The exemplary signal processing part 110 comprises a radio part 605, a de-scrambler 607, a de-spreader 610, a rake receiver 320 and a signal branch comparator 615. The signal processing part 110 has an input connected to the feeder 115, on which signal branches 305 are received from the antenna system 105. The signal processing part 110 converts the signal branches 305 into digital signal branches, which are de-scrambled in de-scrambler 605, de-spread in de-spreader 610 and processed by the rake receiver 320 as described in relation to FIG. 3. The output 620 from the rake receiver 325 delivers an output signal, where the contribution from the different signal branches 305 has been taken into account in the manner described in relation to FIG. 3. An input 623 of the signal branch comparator 615 is connected to an output 625 of the rake receiver 320 in a manner so that the signal branch comparator 615 receives data indicative of the signal branch measures of the different signal branches 305.

Depending on the implementation of the rake receiver 325 and the signal branch comparator 615, outputs 620 and 625 could be implemented as the same output, or different outputs. The signal branch comparator 615 comprises software and hardware for performing an analysis of the received data according to any of the embodiments described above. Furthermore, the signal branch comparator 615 has an output 630 for outputting the result of the performed analysis.

When no de-scrambling or de-spreading of the signal is required, the de-scrambler 607 or the de-spreader 610, respectively, could be omitted. The input 623 of the signal branch comparator 615 need not be connected an output 625 of the rake receiver 320. In an embodiment of the invention where the signal branch measure is not obtained from an output from the rake receiver 320 (e.g. when the radio base station 100 does not comprise a rake receiver 320), the input 623 of the signal branch comparator 615 is connected to receive a signal indicative of the respective signal branch measures of the different antenna branches 120.

In implementations where the evaluation of the antenna system 105 can be performed on a on-demand basis, the comparator 615, or another appropriate entity of signal processing part 110, could comprise an input for receiving instructions to perform an evaluation of the antenna system 105.

In the embodiment illustrated in FIG. 6, the signal branch comparator 615 is implemented in the radio base station 100. However, the signal branch comparator 615 could alternatively be implemented in a monitoring system separate from the radio base station 100.

In the above, the invention has been described in terms of the antenna system 105 of a radio base station 100. However, the invention is equally applicable to any digital radio apparatus employing antenna diversity. Furthermore, although the invention has been described in relation to receiving antennas, it could also be used for monitoring the status of transmitting antennas by utilising the inherent receiving properties that most transmitting antennas have. The invention may also be used to check the status of an antenna system 105 where different antenna elements are used for receiving signals on different channels from transmitters within the same coverage area. In such a situation, the different antenna branches 120 are not for creating antenna diversity, but for increasing the number of channels that can be active at the same time. By making an antenna branch 120 eavesdropping on the other antenna branch(es) 120 covering the same area, an evaluation according to the invention would indicate whether any errors in any of the antennas exists, for covering the same area on different channels receiving.

In order to increase the reliability of the inventive evaluation process, a combination of the different embodiments described above could be employed. For example, an analysis of the performance of antenna branches 120 could be based on the use of two different signal branch measures, or more. Furthermore, the comparison could include both a comparison of the average signal branch measure values, and an analysis based on per-measurement-comparison-results.

The invention claimed is:

1. A method of monitoring an antenna system connected to a radio device comprising a rake receiver, the antenna system comprising at least two antenna branches, the method comprising:
   receiving radio signals as a first signal branch in a first antenna branch;
   receiving the radio signals as a second signal branch in a second antenna branch;
   obtaining first and second streams of samples from the first and second signal branches, and selecting strongest ones of the samples for processing via the rake receiver, without regard to which antenna branch the selected samples originate from; and
   determining performance differences between the first and second antenna branches based on the respective numbers of samples selected from the first and second signal branches, or based on respective signal-to-noise-and-interference ratios of the first and second signal branches, in view of a signal-to-noise-and-interference ratio target for an associated radio link.

2. The method of claim 1, wherein selecting the strongest samples for processing via the rake receiver comprises, for each time interval in a plurality of successive time intervals, selecting the strongest ones of the samples obtained from the first and second signal branches.

3. The method of claim 2, wherein determining performance differences between the first and second antenna branches based on the respective numbers of samples selected from the first and second signal branches comprises comparing the respective numbers of samples selected from the first and second signal branches over the plurality of successive time intervals, or comparing a measure derived from the respective numbers.

4. The method of claim 1, wherein determining performance differences between the first and second antenna branches based on the respective numbers of samples selected from the first and second signal branches comprises, for one or more periods of time, comparing the number of samples selected from the first stream of samples for processing via the rake receiver to the number of samples selected from the second stream of samples for processing via the rake receiver.

5. The method of claim 1, wherein determining performance differences between the first and second antenna branches based on the respective numbers of samples selected from the first and second signal branches comprises, for one or more periods of time, comparing the number of samples selected from the first signal branch to the number of samples selected from the second signal branch.

6. The method of claim 1, further comprising determining that one of the first and second signal branches is faulty responsive to the performance differences determination indicating that one of the first and second signal branches is generally weaker than the other one.

7. The method of claim 1, further comprising initiating an alarm signal or a further investigative process in the radio device, responsive to the performance differences determination indicating that one of the first and second signal branches is generally weaker than the other one.

8. The method of claim 1, wherein the radio signals are received on a random access channel, such that the first and second streams of samples are obtained from radio signals received on the random access channel.

9. The method of claim 1, wherein determining performance differences between the first and second antenna branches based on the respective signal-to-noise-and-interference ratios of the first and second signal branches comprises determining signal-to-noise-and-interference ratio errors for the first and second signal branches, respectively, as the difference between measured signal-to-noise-and-interference ratio determined for the first and second signal branches, and a target signal-to-noise-and-interference ratio.

10. The method of claim 1, further comprising measuring the respective signal-to-noise-and-interference ratios of the first and second signal branches using descrambled and despread signal samples.

11. A radio receiver including a radio device comprising a rake receiver coupled to an antenna system comprising at least two antenna branches, the radio receiver configured to:
- receive radio signals as a first signal branch in a first antenna branch;
- receive the radio signals as a second signal branch in a second antenna branch;
- obtain first and second streams of samples from the first and second signal branches, and selecting strongest ones of the samples for processing via the rake receiver, without regard to which antenna branch the selected samples originate from; and
- determine performance differences between the first and second antenna branches based on the respective numbers of samples selected from the first and second signal branches, or based on respective signal-to-noise-and-interference ratios of the first and second signal branches, in view of a signal-to-noise-and-interference ratio target for an associated radio link.

12. The radio receiver of claim 11, wherein the radio receiver is configured to select the strongest samples for processing via the rake receiver by, for each time interval in a plurality of successive time intervals, selecting the strongest ones of the samples obtained from the first and second signal branches.

13. The radio receiver of claim 12, wherein the radio receiver is configured to determine performance differences between the first and second antenna branches based on the respective numbers of samples selected from the first and second signal branches by comparing the respective numbers of samples selected from the first and second signal branches over the plurality of successive time intervals, or comparing a measure derived from the respective numbers.

14. The radio receiver of claim 11, wherein the radio receiver is configured to determine performance differences between the first and second antenna branches based on the respective numbers of samples selected from the first and second signal branches by, for one or more periods of time, comparing the number of samples selected from the first stream of samples for processing via the rake receiver to the number of samples selected from the second stream of samples for processing via the rake receiver.

15. The radio receiver of claim 11, wherein the radio receiver is configured to determine performance differences between the first and second antenna branches based on the respective numbers of samples selected from the first and second signal branches by, for one or more periods of time, comparing the number of samples selected from the first signal branch to the number of samples selected from the second signal branch.

16. The radio receiver of claim 11, wherein the radio receiver is configured to determine that one of the first and second signal branches is faulty responsive to the performance differences determination indicating that one of the first and second signal branches is generally weaker than the other one.

17. The radio receiver of claim 11, wherein the radio receiver is configured to initiate an alarm signal or a further investigative process in the radio device, responsive to the performance differences determination indicating that one of the first and second signal branches is generally weaker than the other one.

18. The radio receiver of claim 11, wherein the radio receiver is configured to receive radio signals on a random access channel, and wherein the radio signals received on the first and second antenna branches are received on the random access channel, such that the first and second streams of samples are obtained from the radio signals received on the random access channel.

19. The radio receiver of claim 11, wherein the radio receiver is configured to determine performance differences between the first and second antenna branches based on the respective signal-to-noise-and-interference ratios of the first and second signal branches by determining signal-to-noise-and-interference ratio errors for the first and second signal branches, respectively, as the difference between measured signal-to-noise-and-interference ratio determined for the first and second signal branches, and a target signal-to-noise-and-interference ratio.

20. The radio receiver of claim 11, wherein the radio receiver is configured to measure the respective signal-to-noise-and-interference ratios of the first and second signal branches using descrambled and despread signal samples.

* * * * *

UNITED STATES PATENT AND TRADEMARK OFFICE
CERTIFICATE OF CORRECTION

PATENT NO. : 8,548,029 B2
APPLICATION NO. : 12/517650
DATED : October 1, 2013
INVENTOR(S) : Willgert It is certified that error appears in the above-identified patent and that said Letters Patent is hereby corrected as shown below:

In the Drawings

In Fig. 4, Sheet 4 of 6, for Tag "405", in Line 2, delete "rake receiver 220" and insert -- rake receiver 320 --, therefor.

In the Specification

In Column 1, Line 27, delete "to or" and insert -- to, or --, therefor.

In Column 6, Line 59, delete "305 B" and insert -- 305B --, therefor.

In Column 7, Line 27, delete "rake fingers 320" and insert -- rake fingers 325 --, therefor.

In Column 7, Line 58, delete "low. i.e." and insert -- low, i.e. --, therefor.

In Column 8, Line 9, delete "$SIR^{error}=SIR^{measured}-SIR^{target}$ (1)." and insert -- $SIR^{error}=SIR^{measured}-SIR^{target}$, (1) --, therefor.

In Column 8, Line 15, delete "$SIR^{error}$." and insert -- $SIR^{error}$, --, therefor.

In Column 8, Lines 47-48, delete "Spreading Factor (SP)." and insert -- Spreading Factor (SF). --, therefor.

In Column 9, Line 4, delete "pre-ambles" and insert -- preambles --, therefor.

In Column 10, Lines 5-6, delete "signal branches 120" and insert -- signal branches 305 --, therefor.

In Column 10, Line 28, delete "(SBM)." and insert -- (SBM), --, therefor.

Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,548,029 B2

In Column 10, Line 36, after Equation, delete "." and insert -- , --, therefor.

In Column 10, Line 54, delete "exemplar)" and insert -- exemplary --, therefor.

In Column 10, Lines 66-67, delete "signal branch 120A or in signal branch 120B." and insert -- signal branch 305A or in signal branch 305B. --, therefor.

In Column 11, Line 46, delete "expression (6)" and insert -- equation (6) --, therefor.

In Column 12, Line 66, delete "de-scrambler 605," and insert -- de-scrambler 607, --, therefor.

In Column 13, Lines 1-2, delete "rake receiver 325" and insert -- rake receiver 320 --, therefor.

In Column 13, Line 9, delete "rake receiver 325" and insert -- rake receiver 320 --, therefor.